United States Patent [19]

Hunter et al.

[11] Patent Number: 5,394,555
[45] Date of Patent: Feb. 28, 1995

[54] MULTI-NODE CLUSTER COMPUTER SYSTEM INCORPORATING AN EXTERNAL COHERENCY UNIT AT EACH NODE TO INSURE INTEGRITY OF INFORMATION STORED IN A SHARED, DISTRIBUTED MEMORY

[75] Inventors: John C. Hunter; John A. Wertz, both of Phoenix, Ariz.

[73] Assignee: Bull HN Information Systems Inc., Billerica, Mass.

[21] Appl. No.: 993,884

[22] Filed: Dec. 23, 1992

[51] Int. Cl.$^6$ .............................................. G06F 12/00
[52] U.S. Cl. .................... 395/800; 395/425; 364/238.4; 364/246.8; 364/243.41
[58] Field of Search ................. 395/800, 325, 425

[56] References Cited

U.S. PATENT DOCUMENTS 5,297,269 3/1994 Donaldson et al. ............... 395/425

Primary Examiner—Alyssa H. Bowler
Assistant Examiner—John Harrity
Attorney, Agent, or Firm—J. S. Solakian; J. H. Phillips

[57] ABSTRACT

A computer cluster architecture including a plurality of CPUs at each of a plurality of nodes. Each CPU has the property of coherency and includes a primary cache. A local bus at each node couples: all the local caches, a local main memory having physical space assignable as-shared space and non-shared space and a local external coherency unit (ECU). An inter-node communication bus couples all the ECUs. Each ECU includes a monitoring section for monitoring the local and inter-node busses and a coherency section for a) responding to a non-shared cache-line request appearing on the local bus by directing the request to the non-shared space of the local memory and b) responding to a shared cache-line request appearing on the local bus by examining its coherence state to further determine if inter-node action is required to service the request and, if such action is required, transmitting a unique identifier and a coherency command to all the other ECUs. Each unit of information present in the shared space of the local memory is assigned, by the local ECU, a coherency state which may be: exclusive (the local copy of the requested information is unique in the cluster); 2) modified (the local copy has been updated by a CPU in the same node); 3) invalid (a local copy either does not exist or is known to be out-of-date); or 4) shared (the local copy is one of a plurality of current copies present in a plurality of nodes).

3 Claims, 5 Drawing Sheets

MULTI-NODE CLUSTER COMPUTER SYSTEM INCORPORATING AN EXTERNAL COHERENCY UNIT AT EACH NODE TO INSURE INTEGRITY OF INFORMATION STORED IN A SHARED, DISTRIBUTED MEMORY

FIELD OF THE INVENTION

This invention relates to the data processing arts and, more particularly, to a generalized shared memory for use in a cluster architecture.

BACKGROUND OF THE INVENTION

Generally, a cluster computer architecture includes at least one, and typically a plurality of, central processing unit(s) (CPU) and local memory, I/O, etc. resident at each of a plurality of nodes. In one well regarded cluster architecture, physical memory address space is permanently divided into two regions: the lower half is local memory (most significant bit="0"), which is accessible only by the processors in that node, while the upper half (most significant bit="1") defines shared memory, which is physically centralized and accessible by all nodes. There is no hardware support to maintain coherency among copies of shared variables contained in different nodes. Coherency is thus left entirely to software.

The Bull HN Shared Buffer Architecture (SBA) expands upon this architecture by introducing a hardware mechanism that maintains coherency among copies of data that originated in the physically centralized shared memory but are contained in the cache memories of different nodes in the cluster. This improves the performance of the architecture by permitting the different nodes to perform some operations on shared data in parallel and with shorter access times.

A variation of SBA, the Bull HN Distributed Shared Buffer Architecture (DSBA) uses distributed shared memory instead of a centralized shared memory, a configuration which has a number of advantages in terms of performance and availability as well as compatibility with some existing computer products. The address division between private and shared memory remains the same, but the shared memory is replicated at each computer, thus permitting simultaneous read access by all nodes. A hardware coherency mechanism ensures that the data in the shared memories remains coherent.

These variations of the known architecture all employ a rigid partition between private and shared memory. This characteristic makes it difficult, if not impossible, to configure different sizes of private and shared memory to meet the needs of the application mix, both within and among nodes in the cluster. Private memory can never be used for shared applications, and if shared memory is used for private purposes, it is subject to unnecessary coherency traffic and potential integrity problems. The present invention overcomes this restriction.

OBJECTS OF THE INVENTION

It is therefore a broad object of this invention to achieve an improved cluster architecture.

It is a more specific object of this invention to provide a cluster architecture employing a generalized shared memory incorporating discontiguous shared objects which can be of any size and be shared by an arbitrary number of nodes in a cluster.

It is another specific object of this invention to provide such a cluster architecture within which shared memory is available very quickly to all elements in the cluster.

SUMMARY OF THE INVENTION

Briefly, these and other objects of the invention are achieved in a cluster architecture by introducing a Generalized Shared Memory, which is maintained in a consistent state by a hardware-based coherency mechanism that operates on shared objects, wherever they happen to be located. This increases both the performance and the versatility of the architectures by permitting the composition of private vs. shared memory to be of arbitrary size and dynamically variable on different computer nodes in the cluster.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 6 illustrates an exemplary external coherency unit associative memory entry.

DESCRIPTION OF THE PREFERRED EMBODIMENT(S)

Figure 1:
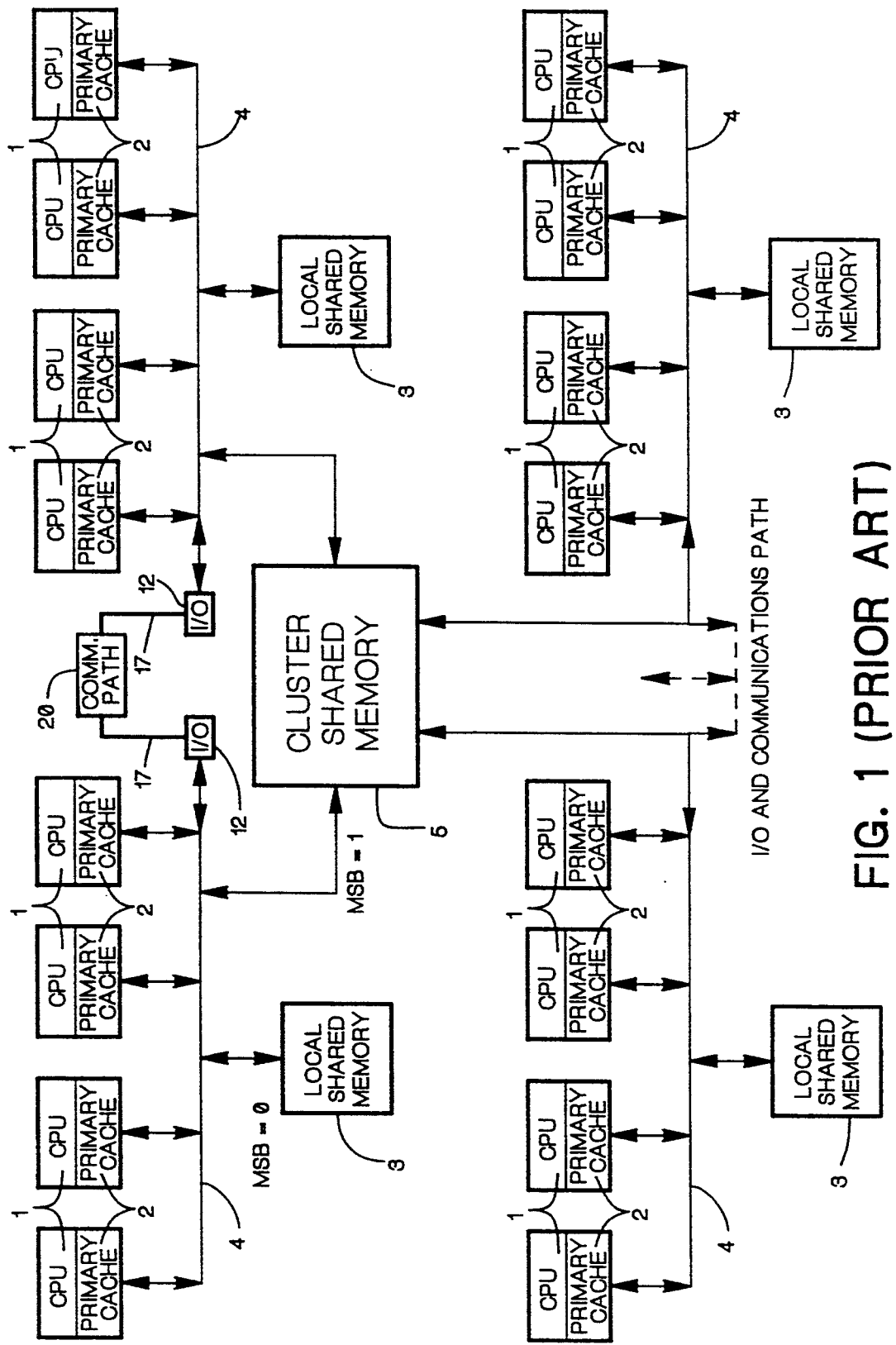
FIG. 1 is a high level block diagram representing a prior art cluster architecture.

First, consider the high level block diagram shown in FIG. 1 which illustrates a cluster architecture which may be deemed state-of-the-art. In this exemplary system, sixteen central processing units (CPUs) 1 are configured into four nodes of four CPUs each. Each CPU has the property of coherence in its communications with other system components and typically incorporates a primary cache 2, and each node includes a local shared memory 3 which communicates through the primary caches with the CPUs 1 in the node via a node-local communications system such as a node-local bus 4. In addition, each node-local bus 4 is coupled to a cluster shared memory 5. Each of the local shared memories 3 and the cluster shared memory, 5 may be the same size, say 2 gigabytes. The memory addressing structure is such that a memory address having a "0" most significant bit (MSB) issued from a given CPU addresses information stored in the local shared memory of the corresponding node, and a memory address having a "1" MSB addresses information stored in the cluster shared memory. Inter-node communication is carried out through I/O units 12 and inter-node bus 17, and, if there is sufficient distance between nodes, a communications path 20 may be employed, all as well known in the art.

This architecture enjoys the advantage that information can be exchanged throughout the cluster via the cluster shared memory 5 by suitable manipulation. However, there are also certain drawbacks to this architecture; for example:

A) the division between private and shared memory is permanently fixed which can be very inefficient for a mix of those applications which, on the one hand, may work best with private memory and those, on the other hand, which may work best with shared memory;

B) there is a single point of failure at the cluster shared memory;

C) each node must have its own operating system; the memory management of all the nodes must agree on individual accesses to the cluster shared memory; and D) the memory management of all the nodes must agree on each individual access to the cluster shared memory.

As previously discussed, there are variations to the architecture shown in FIG. 1 which achieve incremental improvement in system performance. The Shared Buffer Architecture (SBA) variation incorporates a hardware mechanism that maintains coherency among copies of data that originated in the centralized shared memory but are contained in the cache memories of different nodes in the cluster. This increases the performance of the architecture by permitting the different nodes to perform some operations on shared data in parallel and with shorter access times. The Distributed Shared Buffer Architecture (DSBA) uses distributed shared memory instead of a centralized shared memory, a configuration which has a number of advantages in terms of performance and availability as well as compatibility with existing computer products. The address division between private and shared memory remains the same, but the shared memory is replicated at each computer, thus permitting simultaneous read access by all nodes. A hardware coherency mechanism ensures that the data in the shared memories remains coherent.

The subject invention, however, represents a fundamental departure in cluster architecture. In order to understand the subject invention, the concept of a Shared Object (SO,) which is an important aspect of the invention must first be appreciated. An SO can be of any size and be shared by an arbitrary number of nodes in a cluster. The collection of SOs constitutes a Generalized Shared Memory which is maintained in a consistent state by a hardware-based coherency mechanism that operates selectively on SOs, wherever they happen to be located.

The SO is defined as an object that has the capability to be shared. It is known to all nodes of a cluster. A descriptor defines the extent of the SO and the processes that are permitted to share access. An SO can be realized in a variety of ways, depending on the target operating system: as a file (e.g., Bull HN's GCOS® 8 operating system), or a stream (e.g., the UNIX® operating system). The SO is separately instantiated in the virtual space of each node to make it eligible to be shared by processes on different nodes. An SO can then be independently physically instantiated (e.g., on demand) in the memories of different nodes of a distributed shared memory cluster. There can be multiple physical instantiations of a shared object within a centralized shared cluster memory; for example, one which can support pages shared among UNIX processes. An SO has:

A) a unique name with arbitrary length representation;

B) a unique identifier (UUID) with fixed length representation;

C) addressable internal elements; and

D) reference permissions.

Figure 2:
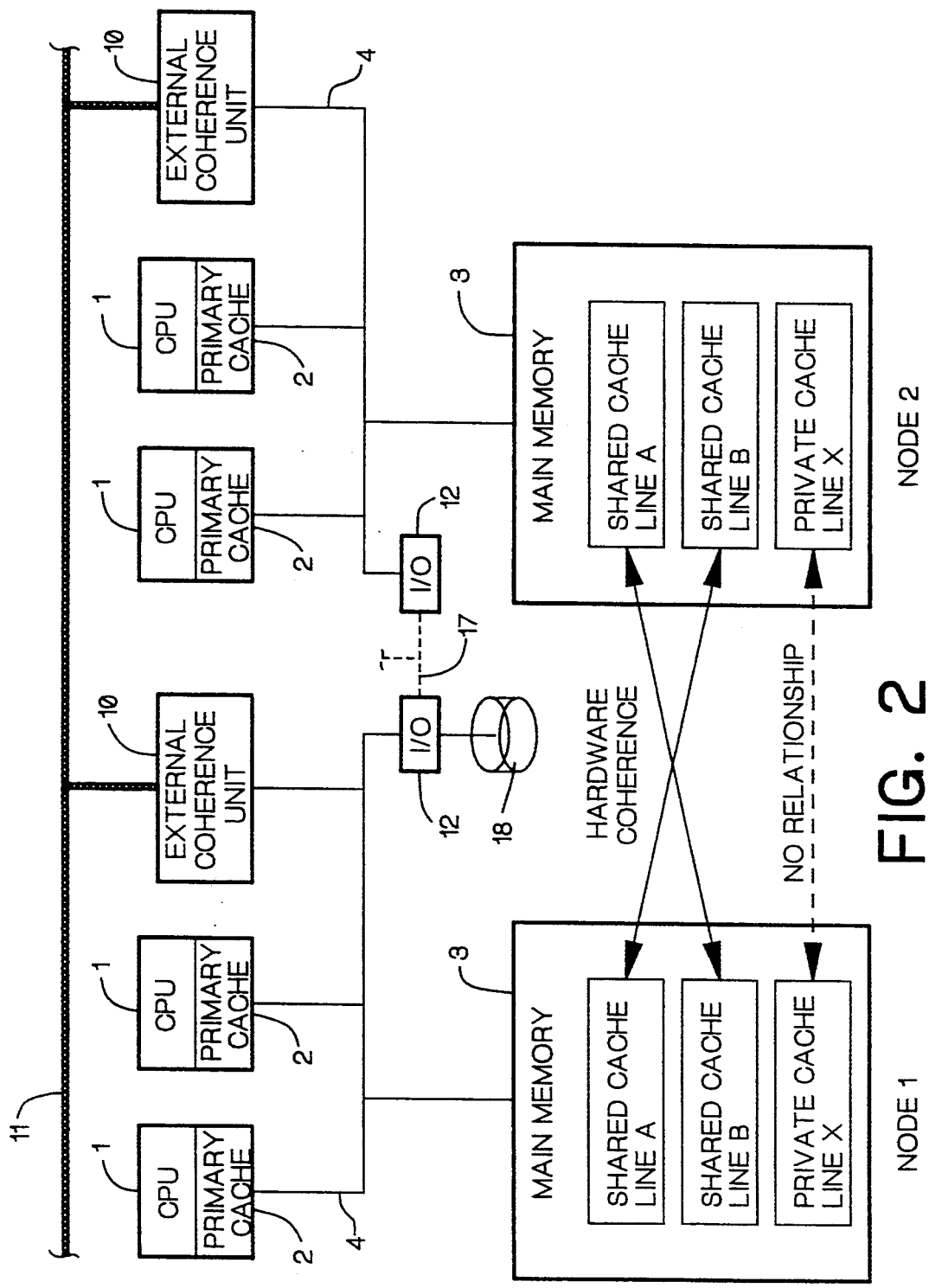
FIG. 2 is a high level block diagram representing a cluster architecture according to the present invention.

The DSBA is an environment which offers the simplest way to understand the real-time operation of SOs. Referring to FIG. 2, each node in the cluster (only two nodes of two CPUs 1 each are shown for simplicity) contains an External Coherency Unit (ECU) 10 that: (a) snoops its own node-local bus 4 for commands on shared cache-lines that are also present in other nodes, and (b) conditionally forwards these commands (using a unique identifier for the cache-line) to the other nodes via, for example, a separate inter-node ECU bus 11. (Point-to-point connections are also possible, using a directory in each ECU to keep track of which nodes have copies.) All other ECUs: (a) snoop the inter-node ECU bus 11 for commands that affect cache-lines resident in their own local memories, (b) translate these to their own physical tags and (c) inject the translated commands into their own node-local buses. In this conceptual example, the ECUs 10 could use ordinary coherence units for implementation and cache-tag directories with a unique identifier and the coherence state (e.g., modified, exclusive, shared, invalid) for each shared cache-line that is presently instantiated in that node.

In exemplary operation, if a CPU in one node in a cluster attempts to alter the contents of a shared cache-line, that CPU must obtain exclusive ownership before proceeding. The command is snooped by the local ECU 10, and if this node does not have exclusive ownership, then the command is transmitted to the ECUs in the other nodes. Each node with a valid unmodified copy invalidates all local copies (e.g., in its primary caches 2 and/or local main memory 3). If a node contains the cache-line in a modified state, it is siphoned to the requesting node and invalidated in the originating node. The cache-line is then owned exclusively and can be updated. The collection of coherency operations guarantees that any process executing on any node that references a shared object will receive the most recent data.

With this architecture, I/0 12 operates correctly to and from local physical memory that has been assigned to contain all or a portion of an SO. I/0 reads from shared memory will automatically siphon the most recent data from the shared memories of other nodes. When I/0 writes into shared memory, exclusive ownership at that node will be obtained automatically as data arrives, and after the I/0 is complete, when the data is referenced by a processor in another node, it will be automatically siphoned to that memory. The benefits resulting from generalized shared memory are as follows:

More Efficient Use of Physical Memory Within and Among Nodes:

(1) the physical instantiations of private and shared memory regions can be discontiguous and of any size as long as their sum does not exceed physical memory size;

(2) different nodes can have different private/shared compositions at any given time; and (3) total memory can exceed the physical addressing capability of a singole operating system/platform.

Simpler Cluster Software:
(1) shared memory is managed independently by each node and does not require a global memory manager or cooperation among nodes to manage shared regions.

Improved Availability:
(1) no single point of failure, as with the centralized shared memory of SBA; and
(2) when a node malfunctions, the private memory regions can be made accessible to another node for recovery by forcing private memory to be sharable.

Less Coherency Traffic:
(1) inter-node coherency traffic is generated only when non-exclusively owned shared objects are written or when shared objects are referenced that are not present; and
(2) coherency traffic is excluded from nodes that do not contain copies of shared objects.

Finally, the performance of distributed generalized shared memory can exceed that of one centralized because the mechanism proposed herein permits shared data to receive the speed benefits of caching while remaining a traditional addressable memory. That is, it permits separate nodes to simultaneously read their own copies of the same shared variable as fast as each local bus can perform. The centralized shared memory in Abrojo and SBA becomes a bottleneck if multiple reads are issued at the same time. There are two basic approaches which can be taken to detect the "shared" capability; viz.: the "hardware scenario" and the "software scenario".

The Hardware Scenario: A Page Table Descriptor Word (PTW) carries a bit to define a page as shared. The PTW is present in the CPU when a shared region is referenced and it places the "shared" bit on the node-local bus to signal the local ECU. This permits the ECU to operate as a cache regarding the physical tags for shared pages with only the most often accessed tags actually retained in the ECU cache; less often referenced tags are retrieved from memory by the ECU.

Advantages: Simple, fast, low cost, and software independent.

Disadvantage: Requires a change in CPU and bus hardware.

The Software Scenario: Every PTW (actually an ECU Entry) for currently instantiated shared pages are contained in a buffer memory in the ECU which then detects shared cache-lines by snooping (or by using a directory with direct connection of the ECUs). The memory manager software updates the PTW buffer in the ECU each time a shared page is instantiated or eliminated.

Advantages: No change required in central system hardware. No extra bit required in PTW. Potentially implementable on existing hardware.

Disadvantage: Requires a change in memory manager software and increases hardware cost.

Figure 3:
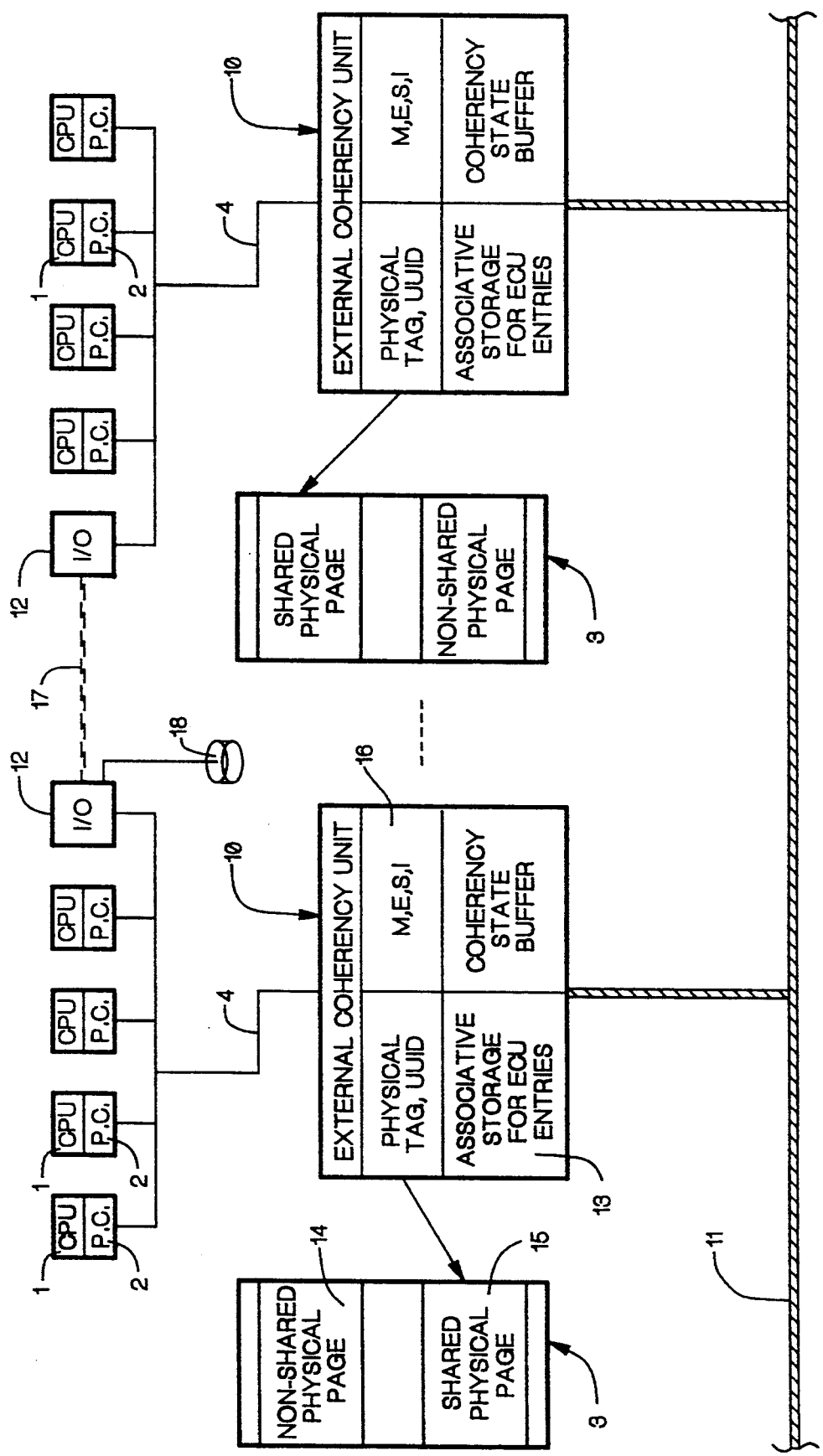
FIG. 3 is a more detailed block diagram particularly showing an intermediate block diagram of an External Coherency Unit component of the cluster architecture according to the present invention.

Attention is now directed to the more detailed exemplary block diagram of FIG. 3. The ECU 10 contains an associative directory 13 whose function is to continuously snoop the addresses on both the node-local bus 4 and the inter-node ECU bus 11. Assume that this directory contains an ECU Entry for each shared page that is currently physically instantiated in its local memory 3. Referring briefly to FIG. 6, the ECU Ennui contains the local physical address of the page, a unique identifier and a set of coherency state bits (2-3 bits) for each cache-line in the page (e.g., there are 64 contiguous 64-byte cache-lines in a 4096 byte page). The total size an ECU Enh), should be between 24 and 32 bytes per shared page.

Referring again to FIG. 3, the ECU 10 ignores commands for non-shared cache-line requests which proceed directly to address the identified memory in the non-shared physical space 14 of the local memory 3. However, when the ECU identifies a command for a shared cache-line, it examines its coherence state (modified, exclusive, shared, or invalid), which is stored in the ECU directory 16, to determine if any inter-node action is required to maintain coherence. If inter-node action is required, the physical address is translated to the appropriate unique identifier and transmitted, together with the appropriate command over the ECU bus to other nodes in the cluster.

For example, if a CPU wishes to obtain an exclusive copy of a shared cache-line, it places a suitable command (e.g., RTW—"read with intent to write"—in the exemplary system to be explained more fully below) on its node-local bus which will cause each ECU 10 to take the following set of possible actions:

(1) if the cache-line state is exclusive or modified, it will be retrieved directly from local memory 3 and sent to the requesting processor with no remote action taken because no other copies exist;
(2) if the state is invalid, an RTW command will be transmitted over the inter-node ECU bus 11 to other nodes. A remote node that contains the line in exclusive or modified state will transmit (siphon) the cache line over the inter-node ECU bus to the requester. If several nodes contain the line in the shared state, all attempt to send it, but ECU bus conventional priority logic will choose one and cancel the others. All remote copies will be set to the invalid state.
(3) if the state is shared, the INV command will be sent to other nodes, which cause them to set their states to invalid (siphoning is not necessary because a current copy already exists in the requesting node).

There are other inter-node actions that are required to maintain coherency with different combinations of inputs from buses and cache-line states; these are summarized below. This coherency procedure, which operates at the hardware level, guarantees than any process executing in any node that references a shared page will see the most recent data for the whole page.

Page In Scenario

Economy dictates that shared pages be physically instantiated only in nodes that actually reference them—for example, at the time of the occurrence of a reference that causes a page fault (i.e., invalid PTW). In conventional systems, the memory manager instantiates the physical page and PTW and then causes an I/0 to bring in the content of the page; e.g., via conventional I/O communications channel 17. In a distributed memory system, however, the page contents might already exist in other nodes. Therefore, the memory manager must, in addition to normal page instantiation services, force a search for the page content by (1) storing an ECU Page Entry in the ECU with all cache-lines marked invalid, and (2) attempting another reference to the location that caused the page fault—this time with a valid PTW. This will result in either (1) a siphon of the requested cache-line from another node into the page frame in memory or (2) determination that the page does not exist in the shared memory of any node. In case (2), the memory management software must determine which node has I/0 access to the memory (e.g., disk) that contains the page and then request (e.g., via special interrupt) that it perform I/0 to bring in the page from disk to its own memory. After the I/0 is complete, the original software can be restarted at the point where the reference occurred and the ECUs will be able to complete the reference by siphoning.

Page-Out Scenario

It is desirable to permit individual nodes to make their own page replacement decisions independently of other nodes. Thus, a shared page that has been instantiated in several nodes should be able to be removed from local memory in those nodes where, for example, it is seldom referenced. A modified shared page that has not been referenced for some time can evicted by signaling (e.g., via special interrupt) the home node to write it to disk 18 (FIG. 3). Memory management software in the home node must physically instantiate the page if it is not present and then initiate I/0 which will gather the most recent complete copy of the page from other nodes as it references each cache line in the page. The coherency states of cache-lines in remote nodes may be left intact or alternatively may be set to the invalid state in the remote nodes. The latter choice makes them more quickly eligible for deletion in those nodes where they are seldom referenced. (The PTW might indicate a modified page, but memory management software can safely discard it if the ECU can be queried to determine that every cache-line is invalid.) Nodes that subsequently reference the page would receive data from the copy in the home node by siphoning.

Figure 4:
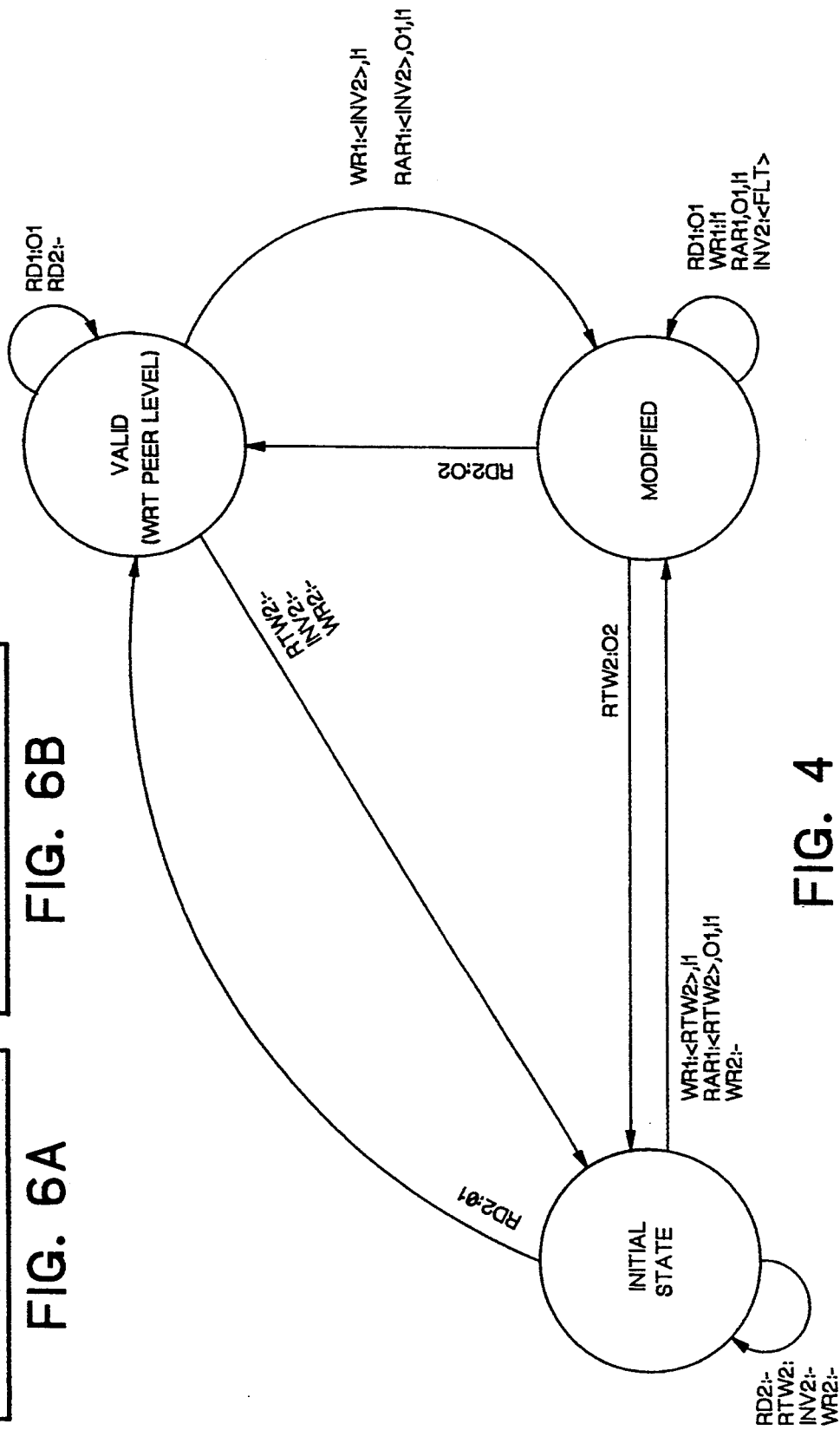
FIG. 4 is a primary cache state transition diagram of a specific computer family chosen as an example.
Figure 5:
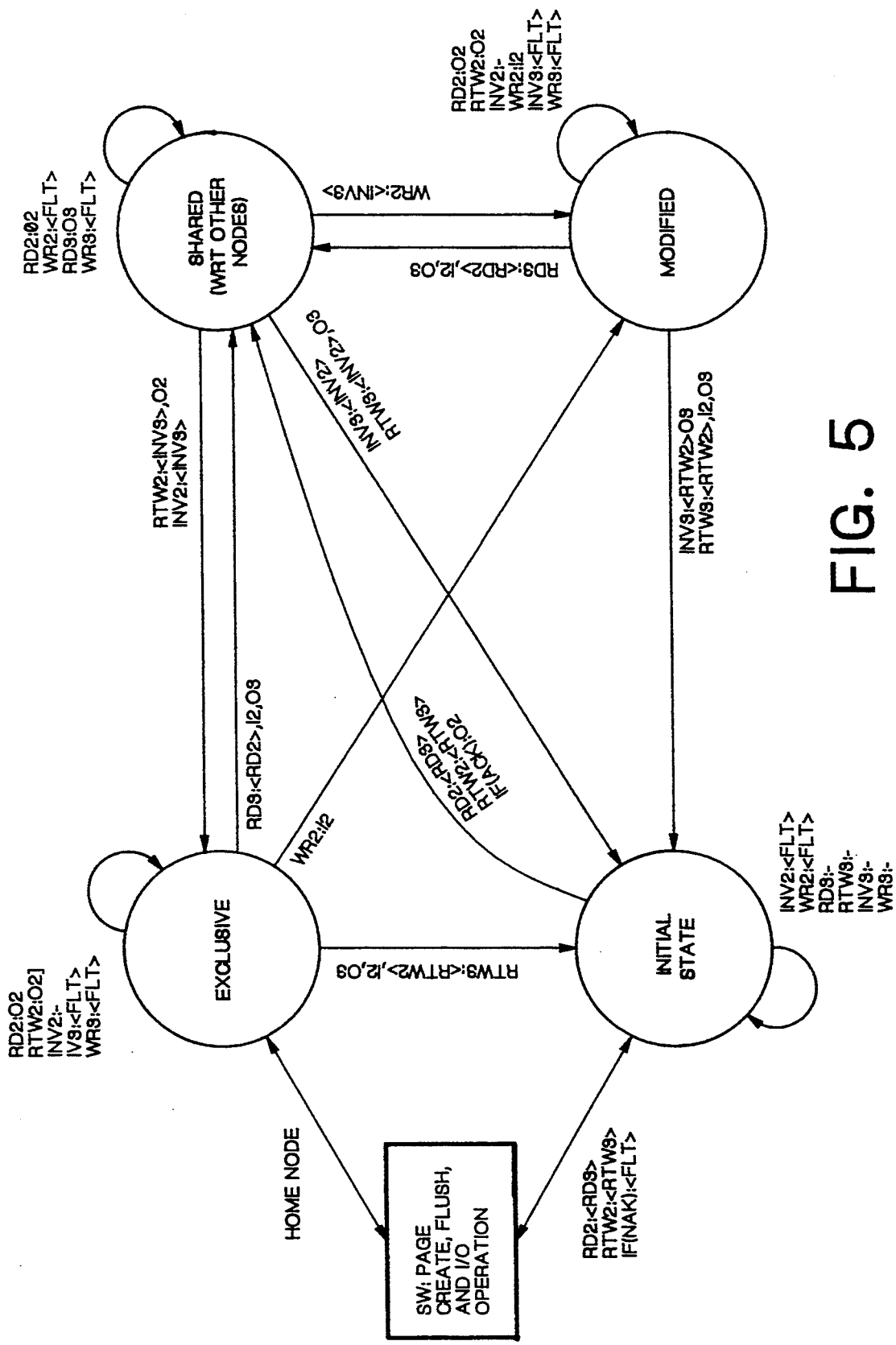
FIG. 5 is an External Coherency Unit state transition diagram as it can be incorporated into the same specific computer family.

Attention is now directed to FIGS. 4 and 5 which are state diagrams for the interfaces among a CPU 1, its primary cache 2, the node-local bus 4, the ECU 10 and the inter-node ECU bus 11 to therefore define the ECU 10 as it may be incorporated into a homogeneous GCOS 8 environment. In this environment, the various terms have the following meanings:

Level 1 Bus is the coupling between a CPU 1 and its primary cache 2.
Level 2 Bus is the node-local bus 4.
Level 3 Bus is the inter-node ECU bus 11.
Data movement commands:
I1—data received from Bus 1.
O1—data output to Bus 1.
I2—data received from Bus 2.
O2—data output to Bus 2.
I3—data received from Bus 3.
O3—data output to Bus 3.
Interface commands:
<RD1>—read into processor.
<WR1>—write from processor.
<RAR1>—read-alter-rewrite atomic operation.
As to the Level 1 Bus (FIG. 5):
<RD2>—request cache-line from Level 2 Bus.
<RTW2>—read cache-line with exclusivity.
<INV2>—order all Level 1 processes to invalidate cache-line.
<WR2>—write cache-line data on the Level 2 Bus.
As to the Level 2 Bus (FIG. 6):
<RD2>—request cache-line from Level 2 Bus.
<RTW2>—read cache-line with exclusivity from other CPU.
<INV2>—invalidate cache-line in all caches on local Level 2 Bus.
<WR2>—remove cache-line from primary cache or siphon.
<RD3>—request cache-line from Level 3 Bus.
<RTW3>—read cache-line with exclusivity from other node.
<INV3>—order all ECUs to invalidate cache-line.
<WR3>—write cache-line to Level 3 Bus.

Those skilled in the art will understand that the invention is readily applicable to hierarchial interconnections of any depth; i.e., there could be a Level 4, Level 5, etc.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A computer cluster architecture comprising:
   A) a plurality of nodes;
   B) at least one central processing unit resident at each said node, at least one of said central processing units including at least one primary cache, each said central processing unit having a property of coherency;
   C) a node-local communications means resident at each said node; each said node-local communications means coupling all said primary caches resident in the same node with said node-local communications means;
   D) a local main memory resident at each said node, each said local main memory having physical space assignable as shared physical space and non-shared physical space;
   E) an external coherency unit resident at each said node, each said external coherency unit being coupled to the node-local communications means and to the local main memory resident in the same node with said external coherency unit;
   F) inter-node communication means coupling all said external coherency units;
   G) each said external coherency unit comprising:
      1) monitoring means adapted to monitor both said inter-node communication means and said node-local communications means resident in the same node with said external coherency unit; and
      2) coherency means adapted to:
         a) respond to said monitoring means sensing a cache-line request appearing on said node-local communications means in the same node with said external coherency unit and determining that such cache-line request is non-shared by directing said non-shared cache-line request to said non-shared physical space of said local main memory; and
         b) respond to said monitoring means sensing a cache-line request appearing on said node-local communications means in the same node with said external coherency unit and determining that such cache-line request is shared by examining its coherence state to further determine if inter-node action is required to service the request and, if such inter-node action is required, transmitting a unique identifier and a coherency command over said inter-node communication means to all other said external coherency units;

(H) each said external coherency unit assigning a coherency state to each unit of information stored in the shared memory spaces of said cluster, said coherency states comprising:
1) exclusive indicating that a copy of the requested information present in the shared memory space of said local main memory resident in the same node as said external coherency unit is unique in the cluster;
2) modified indicating that a copy of the requested information present in said local main memory resident in the same node as said external coherency unit has been updated by a central processing unit in said same node;
3) invalid indicating that a copy of the requested information present in said local main memory resident in the same node as said external coherency unit either does not exist or is known to be out-of-date; and
4) shared indicating that a copy of the requested information present in said local main memory resident in the same node as said external coherency unit is one of a plurality of current copies of the requested information in a plurality of nodes; and I) each said coherency means in each said external coherency unit responding to a local cache-line request associated with a block of shared information as follows:
1) if the requested cache-line state is exclusive or modified, the requested block is retrieved directly from the local main memory resident in the requesting node with no remote action taken because no current copies exist elsewhere in the cluster;
2) if the requested cache-line state is invalid, a read-with-intent-to-write command is transmitted over said communications means to all other said nodes, and a remote node that contains the requested cache-line information in the exclusive or modified state responds thereto by siphoning the requested cache-line information over said communications means to the requesting node; and
3) if the requested cache-line state is shared, an invalidating command is sent to all other nodes such that the requested cache-line state is set to invalid in such all other nodes; whereby, the most recent instantiation of the requested data available in the shared physical spaces among all said local memories in the cluster are provided to the one of said external coherency units requesting the same.

2. The computer architecture of claim 1 in which said inter-node communications means comprises an inter-node external coherency unit bus.

3. The computer architecture of claim 1 in which said inter-node communications means comprises direct coupling means.

* * * * *